United States Patent
Berghaus

(10) Patent No.: US 7,000,953 B2
(45) Date of Patent: Feb. 21, 2006

(54) PIPE SCREW-CONNECTION

(75) Inventor: Gerd Berghaus, Kürten (DE)

(73) Assignee: Voss Fluid GmbH & Co. KG, (DE)

( * ) Notice: Subject to any disclaimer, the term of this patent is extended or adjusted under 35 U.S.C. 154(b) by 248 days.

(21) Appl. No.: 10/152,707

(22) Filed: May 22, 2002

(65) Prior Publication Data

US 2002/0190523 A1 Dec. 19, 2002

(30) Foreign Application Priority Data

May 22, 2001 (DE) ............... 101 24 874

(51) Int. Cl.
*F16L 19/00* (2006.01)
(52) U.S. Cl. ............... 285/354; 285/332.1; 285/332.2; 285/332.3
(58) Field of Classification Search ............ 285/332.2, 285/332.3, 354, 332.1
See application file for complete search history.

(56) References Cited

U.S. PATENT DOCUMENTS

| | | | | |
|---|---|---|---|---|
| 1,977,241 A | * | 10/1934 | Parker ............... | 285/332.1 |
| 2,150,524 A | * | 3/1939 | Starr ............... | 285/334.5 |
| 2,463,883 A | * | 3/1949 | Kinsey ............... | 285/328 |
| 2,867,453 A | | 1/1959 | Snider | |
| 3,764,169 A | * | 10/1973 | St. Clair ............... | 285/52 |
| 3,891,246 A | * | 6/1975 | Hopper ............... | 285/110 |
| 4,150,847 A | | 4/1979 | De Cenzo | |
| 5,060,988 A | * | 10/1991 | Williamson ............... | 285/332.3 |
| 5,109,888 A | | 5/1992 | Usui | |
| 5,192,095 A | | 3/1993 | Behrens | |
| 5,725,259 A | * | 3/1998 | Dials ............... | 285/334.4 |
| 5,893,591 A | * | 4/1999 | Ebel et al. ............... | 285/354 |
| 6,168,211 B1 | * | 1/2001 | Schorn-Gilson ............ | 285/348 |
| 6,237,968 B1 | * | 5/2001 | Bohnes ............... | 285/334.2 |
| 2002/0101079 A1 | * | 8/2002 | Ehrke ............... | 285/354 |

FOREIGN PATENT DOCUMENTS

| | | |
|---|---|---|
| DE | 240 059 | 10/1986 |
| DE | 3520161 A1 | 11/1986 |
| DE | 3824777 | 1/1990 |
| DE | 195 11 063 | 11/1995 |
| DE | 195 20 099 | 1/1997 |
| DE | 195 26 316 | 1/1997 |
| DE | 19526316 A1 * | 1/1997 |
| DE | 195 46 104 | 6/1997 |
| DE | 197 42 917 | 5/1999 |
| DE | 19742917 C1 * | 5/1999 |
| DE | 199 41 577 | 3/2001 |

(Continued)

*Primary Examiner*—James M. Hewitt
(74) *Attorney, Agent, or Firm*—Brinks Hofer Gilson & Lione

(57) ABSTRACT

A pipe screw-connection for connecting a pipeline having a connection end with a deformed annular bead, including a connection stub and a screw-connection coupling part, which can be screw-connected to the connection stub in order to retain the pipeline in a sealed manner is provided. The connection stub has an accommodating opening with a radial step surface for axially supporting an end surface of the pipeline and with an inner cone which widens outward away from the step surface. The pipeline can be clamped in, by way of the annular bead, with a form fit between the connection stub and a supporting ring, which is seated on the pipeline between the annular bead and the screw-connection part. The supporting ring, with the annular bead, forms an abutment surface which is at an angle ($\alpha$) considerably greater than 45° to the screw-connection axis.

19 Claims, 2 Drawing Sheets

FOREIGN PATENT DOCUMENTS

| | | |
|---|---|---|
| EP | 0 926 415 | 6/1999 |
| EP | 0926415 A1 * | 6/1999 |
| EP | 1 054 203 | 4/2000 |
| EP | 1054203 A1 * | 11/2000 |
| GB | 272071 | 6/1927 |

* cited by examiner

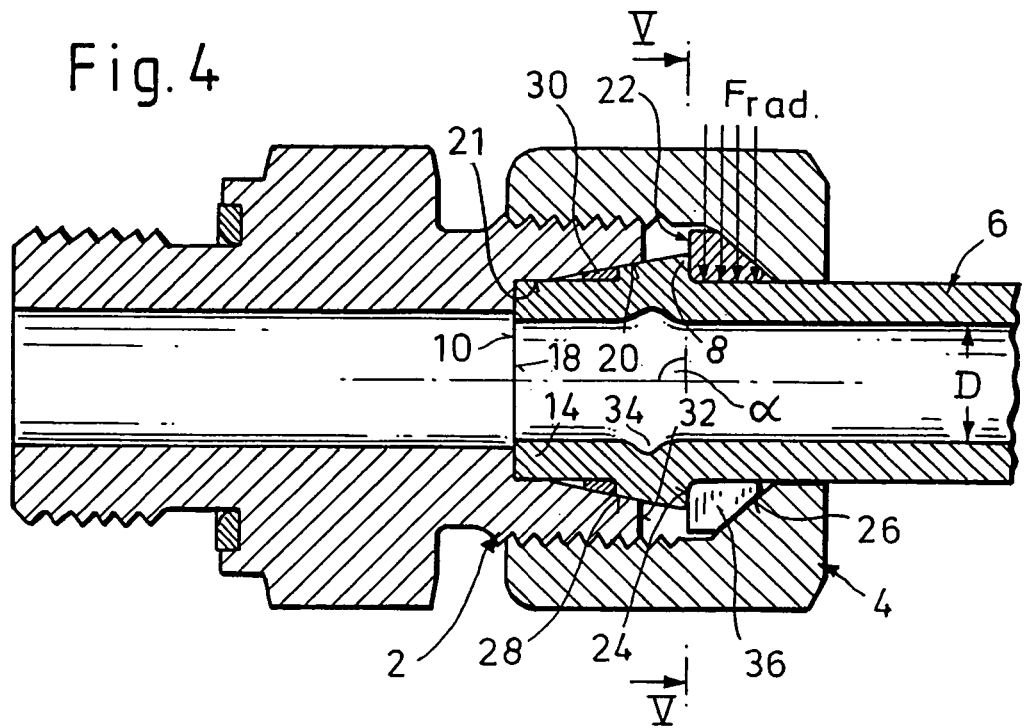
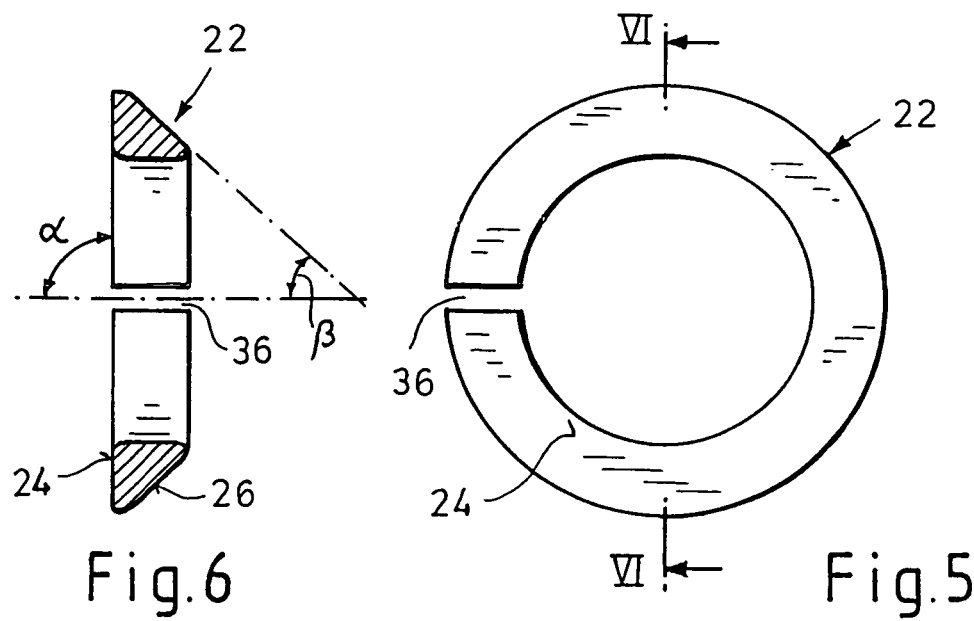

PIPE SCREW-CONNECTION

FIELD OF THE INVENTION

The present invention relates to a pipe screw-connection for connecting a pipeline.

BACKGROUND OF THE INVENTION

The pipeline is of a type having a connection end with a deformed annular bead, comprising a connection stub and a screw-connection coupling part, which can be screw-connected to the connection stub in order to retain the pipeline in a sealed manner. The connection stub has an accommodating opening with a radial step surface for axially supporting an end surface of the pipeline and with an inner cone which widens outward away from the step surface. The pipeline may be clamped-in, by way of the annular bead, with a form fit between the connection stub and a supporting ring, which is seated on the pipeline between the annular bead and the screw-connection part.

Numerous configurations of pipe screw-connections for connecting prefabricated pipelines each having an annular bead formed by an upsetting operation are known. Examples include the following publications: DE 195 20 099 C2, DE 195 26 316 C2, and EP 1 054 203 A1. The main disadvantage with such pipe screw-connections is that, during assembly, by virtue of the screw-connection part (coupling nut) being screw-connected, the pipe tends to rotate in unison. In the case of two similar pipe screw-connections according to DE 195 11 063 C2 and DD 240 059 A1, the pipe is clamped in via two cone surfaces in the region of the deformed annular bead between the stub and coupling nut. In the case of the known arrangements, the pipe tends to rupture immediately behind the annular bead when subjected to dynamic loading.

EP 0 926 415 A1 discloses a pipe screw-connection (pipe connection) of the generic type described in the introduction. Provided in this case in order to avoid the pipe rotating along in unison is a supporting ring or a supporting sleeve which is seated on an axis-parallel pipe section between the coupling nut and the deformed annular bead and, with the annular bead, forms an abutment surface which is to be at an angle of between 15° and 40° to the pipe or screw-connection axis. In particular a radial abutment surface, i.e. one running at right angles to the axis, is to be formed in the direction of the coupling nut; alternatively, there may also be cone abutment in this region, in an inner cone of the coupling nut, at an angle of between 45° and 70° to the pipe axis. It has been found that it is also the case that this known pipe connection of the generic type still does not rule out to a sufficiently reliable extent the situation where the pipe rotates along in unison during the screw-connection assembly. Moreover, there is also a fairly high risk of rupturing in the region of the clamped-in annular pipe bead.

DE 197 42 917 C1 describes a further similar pipe screw-connection, the pipe being retained in a clamped-in state, by way of the annular bead, likewise in a conical surface of a separate supporting ring. In this case, however, the supporting ring is supported, on the one hand, on the coupling nut and, one the other hand, on the radial end surface of the connection stub, this giving rise to a rigid limitation to tightening.

BRIEF DESCRIPTION OF THE INVENTION

The object of the present invention, taking the above described prior art as the departure point, is to provide a pipe screw-connection which is cost-effective and reliable to assemble, ensures a high static and dynamic loading capability and addresses the above described effect where the pipe is rotated along in unison.

This is achieved according to the invention in that the supporting ring, with the annular bead of the pipeline, forms an abutment surface which is at an angle of considerably greater than 45° to the screw-connection axis, to be precise this angle is preferably 90°. The abutment surface between the supporting ring and the annular pipe bead is thus preferably oriented radially, as a result of which, during tightening, any radial force component is advantageously eliminated altogether in this deformed annular-bead region. In combination therewith, it is additionally advantageous if, on the one hand, the supporting ring, with the screw-connection part, forms a conical abutment surface which is at an angle of approximately 45° to the screw-connection axis and, on the other hand, the annular bead of the pipeline has a cone section for insertion into the inner cone of the connection stub, the cone section having a cone angle, corresponding to the inner cone, of 24° in particular (standard connection).

The invention is based on the finding that, in the case of the above-described prior art, pipe ruptures are attributable, in particular, to the fact that clamping in takes place precisely in the deformed bead region and always via cone abutment. This means that moments and forces introduced from the outside act without damping on the pipe region immediately behind the annular bead, with the pipe region being work-hardened by the deformation and less elastic. According to FIG. 2 of EP 0 926 415 A1, the pipe is indeed also clamped in radially in the non-deformed region, by the supporting ring interacting with the coupling nut via cone abutment, but this radial force in the non-deformed pipe region is disadvantageously eliminated again, at least in part, by the conical abutment against the pipe bead. It is not possible in the case of this configuration to avoid the pipe rotating along in unison during assembly.

By virtue of the configuration according to the invention, the situation where the pipe rotates along in unison is very reliably avoided since the surface pressure in the inner stub cone is greater than in the region of the radial abutment surface between the annular pipe bead and supporting ring. When the screw-connection is tightened, the supporting ring, with the screw-connection part, is thus rotated relative to the connection stub and the pipeline, which is not rotated along in unison. In the region of the preferably conical abutment surface between the supporting ring and screw-connection coupling part, however, the fixed screw-connection causes the supporting ring to be pressed radially, which advantageously results in the pipe being reliably clamped in firmly, precisely in its non-deformed pipe region, which is spaced apart from the annular bead and is thus not work-hardened by the deforming operation. This avoids pipe ruptures under high dynamic loading in that, in the region of the radial abutment surface on the annular bead, by virtue of the 90° angle which is preferred according to the invention, a radial force component which counteracts the radial force on the other, conical abutment surface on the screw-connection part is deliberately avoided. Finally, in addition, the radial abutment surface according to the invention between the supporting ring and annular pipe bead also causes the assembly force to be minimized on account of low surface pressure. The main advantage achieved by the invention is thus a high dynamic loading capability; it is possible to ensure a so-called alternating bending strength in the range of from 130 t0 140 N/mm².

The effect achieved according to the invention may be considerably improved, in a further preferred configuration, in that one location of the annular circumference of the supporting ring is interrupted by a, for example, approximately radial slot such that said supporting ring can be elastically or plastically deformed in the radial direction, i.e. in particular narrowed in diameter, with a relatively small amount of force. As a result, a relatively easy deformation of the supporting ring, which can be achieved with a small amount of force and is brought about via the conical abutment contact with the screw-connection part, causes the pipe to be clamped in particularly uniformly over the circumference and thus very effectively in the radial direction.

Further advantageous features of the invention and advantages achieved thereby are contained in the subclaims and the following description.

The invention will be explained more precisely with reference to preferred exemplary embodiments illustrated in the drawing, in which:

BRIEF DESCRIPTION OF THE DRAWINGS

FIG. 4 shows a view as in FIG. 1 of a second advantageous configuration of the pipe screw-connection according to the invention;

FIG. 5 shows a view V—V according to FIG. 4 merely of an advantageous configuration of the supporting ring; and FIG. 6 shows a diametrical section through the supporting ring along plane VI—VI according to FIG. 5.

DETAILED DESCRIPTION OF THE INVENTION

Figure 1:
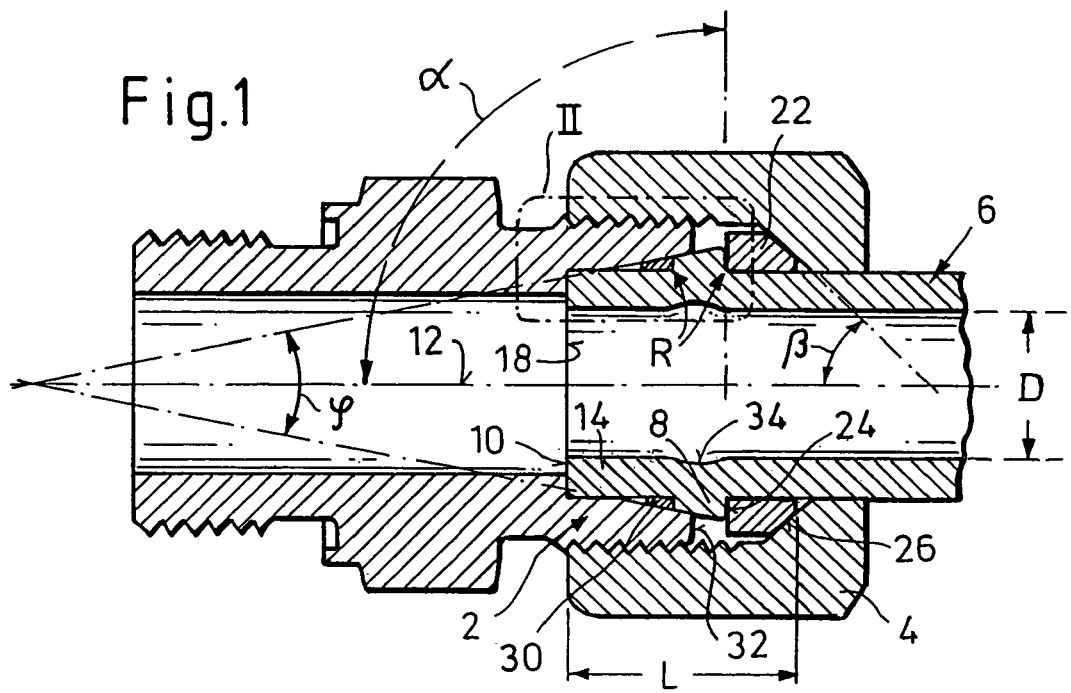
FIG. 1 shows an axial section through a first embodiment of a pipe screw-connected, assembled state.

As can be gathered first of all from FIGS. 1 and 4 in each case, a pipe screw-connection according to the invention comprises a connection stub 2 and a screw-connection coupling part 4, which is usually designed as a coupling nut which can be screwed, by way of an internal thread, onto an external thread of the connection stub 2. And in particular metallic pipeline 6 which is to be connected has, at a connection end, a radially outwardly projecting annular bead 8, which is formed by being upset by plastic deformation. A hollow-cylindrical pipe end section 14, which is parallel to the screw-connection axis 12 (axis-parallel), is formed between the annular bead 8 and an end surface 10 of the connection end of the pipeline 6. The connection stub 2 has an accommodating opening 16 (FIG. 2) with a radial step surface 18 for axially supporting the pipeline 6 by abutment of the end surface 10. In addition, an inner cone 20 is formed within the accommodating opening 16, said inner cone widening outward away from the step 18 and the inner cone 20, said transition surface having an internal diameter which corresponds approximately to the external diameter of the pipe end section 14.

In order to secure the pipeline 6, the annular bead 8 can be clamped in with a form fit between the connection stub 2 and an additional supporting ring 22, the supporting ring 22 being seated on the pipeline 6 between the annular bead 8 and the screw-connection part 4.

According to the invention, the supporting ring 22, with the annular bead 8, forms an abutment surface 24 which encloses an angle α of considerably greater than 45° with the screw-connection axis 12. In this context "considerably greater" means that the angle α is at least approximately 80° but is a maximum of approximately, 100°, i.e. it should be at least more or less be a right angle. In a preferred configuration, the angle α is equal to 90°, with the result that the abutment surface 24 is oriented radially, perpendicularly to the screw-connection axis 12. This angle α between the abutment surface 24 and the axis 12 is measured on the side of the annular pipe bead 8, i.e. the annular bead 8 is located within the length (24, 12) bounding the angle α, while the supporting ring 22 is located outside (see FIGS. 1, 4, and 6).

On the other side, the supporting ring 22, with the screw-connection part 4, preferably forms a conical abutment surface 26 which, on the side of the supporting ring 22, encloses an angle β of approximately 45° with the screw-connection axis 12. The coupling part 4 is expediently a standard coupling nut, the inner-core angle of which is 45° (=half angle; full cone angle=90°), with the result that this also applies correspondingly to the angle β.

In a further advantageous configuration of the invention, the annular bead 8 of the pipeline 6, following the abutment surface 24, has a cone section 28, tapering in the direction of the end surface 10, for partial insertion into the inner cone 20 of the connection stub 2. For this purpose, the cone section 28 has a corresponding cone angle of, in particular, φ=24° (in the case of a standard configuration of the connection stub 2).

Figure 2:
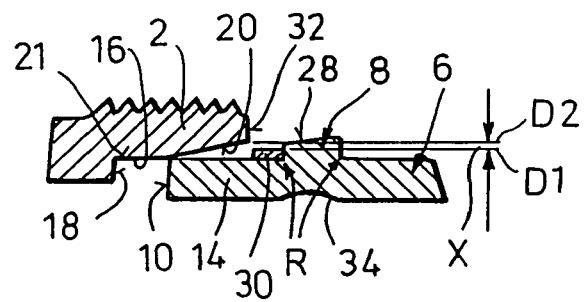
FIG. 2 shows a separate illustration of the region 11 in FIG. 1 in a state prior to assembly.

An elastic sealing ring 30 is advantageously arranged in the transition region between the cone section 28 and the axis-parallel pipe end section 14, which has the end surface 10. An accommodating space for this sealing ring 30 is formed between the cylindrical outer surface of the pipe end section 14 and an adjacent, radial boundary surface of the annular bead 8. As can be gathered from FIG. 2, in a state in which it is seated on the pipeline 6 in a non-deformed manner prior to the pipe assembly, the sealing ring 30 has a maximum external diameter D1, which is smaller than the largest diameter D2 at the mouth-opening outlet of the inner cone 20 of the connection stub 2. This results in a difference X in diameter, which is depicted in FIG. 2. In combination therewith, the length of the projecting cylindrical pipe end section 14 is dimensioned such that, during introduction, said pipe end section reaches the region of the smallest cone diameter in the transition to the cylindrical transition surface 21 even before the seal ring 30 comes into contact with the inner cone 20. This configuration advantageously avoids damage of the relatively flexible sealing ring 30 during insertion into the accommodating opening 16 and/or the inner cone 20 (optimum protection of the sealing ring during assembly). The sealing ring 30 here has a, for example, approximately rectangular ring cross section (FIG. 2) which in certain regions, in particular in the annular region oriented in the direction of the pipe end surface 10, projects beyond an imaginary, conical enveloping surface defined by the cone section 28, in order, in the assembled state according to FIG. 1, to butt with sealing action, under prestressing, against the inner cone 20.

As can be gathered from the screw-connected, assembled position in FIGS. 1 and 4, according to the invention, both the pipeline 6 and the supporting ring 22 are abutment-free in respect of a radial end surface 32 of the connection stub 2. This means that the pipeline 6 butts against the connection stub 2 exclusively via the end surface 10, butting against the step surface 18, and via the cone section 28, seated in the inner cone 20. Without any abutment contact with the stub end surface 32, the annular bead 8 is thus only clamped axially between the inner cone 20 and the supporting ring 22.

Figure 3:
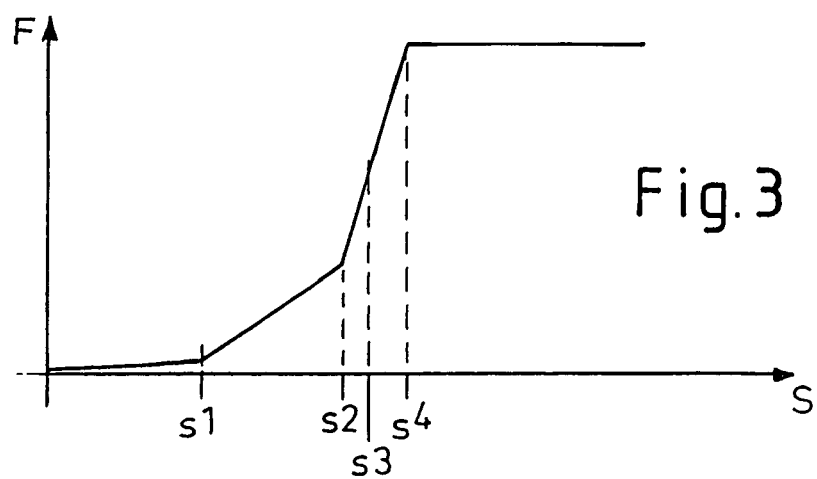
FIG. 3 shows a force/distance diagram for the purpose of explaining the assembly operation.

In this case, the connection end of the pipeline 6 is designed in adaptation to the—in particular standard—connection stub 2 such that, during the pipe assembly, by virtue of the screw-connection being tightened, first of all the cone section 28 butts against the inner stub cone 20 and it is only then, to be precise following elastic radial widening of the connection stub 2 as a result of the cone action, that the pipe end surface 10 butts against the radial step surface 18 on the connection stub 2. This screw-connection operation is illustrated in FIG. 3 by way of a force/distance diagram. First of all, the screw-connection part 4 can be screw-connected to the connection stub 2 with a small amount of force, e.g. manually, until, in the first position, the cone section 28 butts against the inner stub cone 20. This results in a first considerable increase in force since the connection stub 2, as screw-connection progresses, is widened elastically in the radial direction until, in a second position, the end surface 10 butts against the step surface 18. As tightening of the screw-connection continues, elastic axial upsetting, with an even steeper force characteristic curve, occurs in the region of the clamping-in length L depicted in FIG. 1 because, according to the invention as has already been explained above—a further rigid limitation to tightening by abutment against the stub end surface 32 as deliberately been dispensed with. The desired screw-connection end position, according to FIG. 3, precedes the beginning of the plastic deformation region.

In respect of the annular bead 8, which is formed by a specific upsetting operation using a suitable tool, it is also advantageous for rounded transitions to be formed between the annular bead 8 and the adjacent, axis-parallel pipe sections, such transitions being indicated by R in each case in FIGS. 1 and 2. It is further advantageous for the shaping upsetting operation to be carried out with a low degree of deformation (i.e. minimal radial widening), such that, even in the region of the annular bead 8, the pipeline 6 maintains a more or less cylindrical inner surface with approximately the original internal pipe diameter D. As is illustrated, there may be, at most, a slight inner groove-like curved formation 34 produced in this region. This minimizes dead spaces, which could course turbulent flow, in the pipe interior.

FIGS. 4 to 6 illustrate an advantageous configuration of the invention, according to which one location of the circumference of the supporting ring 22 is interrupted by a through-slot 36—in this case running radially by way of example. By virtue of this slot 36, it is possible for the supporting ring 2 in particular to be elastically, but possibly also plastically, deformed in respect of its diameter with a small amount of force, i.e. in particular reduced in size (narrowed), but of course also increased in size (widened). The narrowing capability makes it possible, via the conical abutment surface 26, to produce a circumferentially very uniform radial force $F_{rad}$ (see FIG. 4) for effectively clamping the pipe in the radial direction.

To conclude, the essential advantages of the present invention will be summarized as follows:
long clamping in length L or large lever arm L for absorbing alternating bending loading;
low degree of deformation and/or a low degree of work-hardening of the pipeline; consequent reduction in the risk of rupturing and small deformation forces required for upsetting the annular bead;
resiliently elastic axial prestressing of the clamped-in connection end in the manner of a compression-spring bar in order to compensate for signs of settling;
primary metallic seal in the region of the pipe end surface 10 in the direction of the stub step surface 18; consequent quasi static loading of the secondary flexible seal, which is formed by the elastic sealing ring 30;
avoidance of damage during introduction into the inner cone as a result of the specific arrangement of the flexible seal;
reliable avoidance of the pipe rotating along in unison during assembly since the surface pressure in the inner cone 20 is greater than in the region of the abutment surface 24 between the supporting ring 22 and annular bead 8 of the pipeline 6 and as a result, when the screw-connection is tightened, the pipeline 6 is fitted in a rotationally fixed manner in the connection stub 2, while the supporting ring 22 rotates with the screw-connection part 4 on the pipeline 6 until it is clamped in firmly together with the annular pipe bead 8.
reliable, gap-free end closure of the sealing ring 30 in order to avoid gap extrusion even in the case of incomplete assembly as a result of the high surface pressure in the cone region;
as a result of the angles $\alpha$ and $\beta$ according to the invention between the supporting ring 22 and annular bead 8 or screw-connection part 4 respectively:
the pipeline is clamped in firmly in its non-deformed, non-work-hardened pipe region, this resulting in avoidance of ruptures under dynamic loading (the specific angle $\alpha=90°$ means that there is no radial force component which could counteract the radial force in the region of the abutment surface 26 on the screw-connection part);
minimization of the necessary assembly force as a result of low surface pressure in the region of the abutment surface 24;
Avoidance of notch effects as a result of the rounded formations R, and thus avoidance of ruptures under dynamic loading. Since there are no cross-sectional narrowings, and dead spaces are minimized, in the pipe, this results in a smooth flow region with minimal pressure loss.

Rather than being restricted to the exemplary embodiments illustrated and described, the invention also covers all equivalent configurations within the scope of the invention.

While the above description constitutes the preferred embodiment of the present invention, it will be appreciated that the invention is susceptible to modification, variation and change without departing from the proper scope and fair meaning of the accompanying claims.

I claim:

1. A pipe screw-connection for connecting a pipeline having a connection end with a deformed annular bead, comprising a connection stub and a screw-connection coupling part, which can be screw-connected to the connection stub in order to retain the pipeline in a sealed manner, the connection stub having an accommodating opening with a radial step surface for axially supporting an end surface of the pipeline and with an inner cone which widens outward away from the step surface, it being possible for the pipeline to be clamped in, by way of the annular bead, with a form fit between the connection stub and a supporting ring which is being seated on the pipeline between the annular bead and the screw-connection part, wherein the supporting ring, together with the screw-connection part, forms a conical abutment surface which is at an angle (β) of approximately 45° relative to the screw-connection longitudinal axis, such that the pipeline is clamped in radially in this region, and wherein the supporting ring, together with the annular bead, forms an abutment surface which is at an angle (α) considerably greater than 45° relative to the screw-connection axis, such that, when the screw-connection is tightened, this region is essentially free of radial force components, so that the supporting ring is pressed radially only by means of and in the area of the conical abutment surface with the screw-connection coupling part, which results in the pipeline being clamped radially precisely only in a non-deformed pipe region, which is spaced apart from the annular bead.

2. The pipe screw-connection as claimed in claim 1, wherein the angle (α) of the abutment surface between the supporting ring and annular pipe bead is in the range of from at least 8° to a maximum of 100°.

3. The pipe screw-connection as claimed in claim 1, wherein the circumference of the supporting ring is interrupted by a slot such that said supporting ring can be radially deformed.

4. The pipe screw-connection as claimed in claim 1, wherein the annular bead of the pipeline has a cone section for intersection into the inner cone of the connection stub, the cone section having a cone angle (φ), corresponding to the inner cone, of 24°.

5. The pipe screw-connection as claimed in claim 4, wherein an elastic sealing ring is arranged in the transition region between the cone section and an axis-parallel pipe end section, which has the end surface.

6. The pipe-screw connection as claimed in claim 5, wherein in a state in which it is seated in a non-deformed manner on the axis-parallel pipe end section of the pipeline, the sealing ring has a maximum external diameter (D1), which is smaller than the largest diameter (D2) at the mouth-opening outlet of the inner cone of the connection stub.

7. The pipe screw-connection as claimed in claim 4, wherein the connection end of the pipeline is designed in adaptation to the connection stub such that, during the pipe assembly, by virtue of the screw-connection being tightened, first of all the cone section butts against the inner cone of the connection stub, and then the pipe end surface butts against the radial step surface in the connection stub.

8. The pipe screw-connection as claimed in claim 1, wherein in the screw-connected, assembled state, the pipeline and the supporting ring are abutment-free with respect to a radial end surface of the connection stub.

9. The pipe screw-connection as claimed in claim 1, wherein at least one rounded transition (R) is formed between the annular bead and adjacent, axis-parallel pipe sections.

10. The pipe screw-connection as claimed in claim 1, wherein in the region of the annular bead, the pipeline is plastically deformed with a low degree of deformation by a shaping upsetting operation, such that, even in the region of the annular bead, the pipeline has a generally cylindrical inner surface.

11. The pipe screw-connection as claimed in claim 1, wherein the angle (α) of the abutment surface between the supporting ring and annular pipe bead is about 90°.

12. A pipe screw-connection for connecting a pipeline having a connection end with a deformed annular bead, comprising a connection stub and a screw-connection coupling part, which can be screw-connected to the connection stub in order to retain the pipeline in a sealed manner, the connection stub having an accommodating opening with a radial step surface for axially supporting an end surface of the pipeline and with an inner cone which widens outward away from the step surface, it being possible for the pipeline to be clamped in, by way of the annular bead, with a form fit between the connection stub and a supporting ring, which is seated on the pipeline between the annular bead and the screw-connection part wherein the supporting ring, with the annual bead, forms an abutment surface which is at an angle (α) considerably greater than 45° relative to the screw-connection longitudinal axis, such that, when the screw-connection is tightened, this region is essentially free of radial force components, wherein the annual bead of the pipeline includes a cone section for intersection into the inner cone of the connection stub, the cone section having a cone angle (φ), corresponding to the inner cone, of 24°.

13. The pipe screw-connection as claimed in claim 12, wherein the elastic sealing ring is arranged in the transition region between the cone section and an axis-parallel pipe end section, which has the end surface.

14. The pipe-screw connection as claimed in claim 13, wherein in a state in which it is seated in a non-deformed manner on the axis-parallel pipe end section of the pipeline, the sealing ring has a maximum external diameter (D1), which is smaller than the largest diameter (D2) at the mouth-opening outlet of the inner cone of the connection stub.

15. The pipe screw-connection as claimed in claim 12, wherein the connection end of the pipeline is designed in adaptation to the connection stub such that, during the pipe assembly, by virtue of the screw-connection being tightened, first of all the cone section butts against the inner cone of the connection stub, and then the pipe end surface butts against the radial step surface in the connection stub.

16. The pipe screw-connection as claimed in claim 12, wherein the angle (α) of the abutment surface between the supporting ring and annular pipe bead is about 90°.

17. A pipe screw-connection for connecting a pipeline having a connection end with a deformed annular bead, comprising a connection stub and a screw-connection coupling part, which can be screw-connected to the connection stub in order to retain the pipeline in a sealed manner, the connection stub having an accommodating opening with a radial step surface for axially supporting an end surface of the pipeline and with an inner cone which widens outward away from the step surface, it being possible for the pipeline to be clamped in, by way of the annular bead, with a form fit between the connection stub and a supporting ring, which is seated on the pipeline between the annular bead and the screw-connection part wherein the supporting ring, with the annular bead, forms an abutment surface which is at an angle (α) between 80° and 100° relative to the screw-connection longitudinal axis, such that, when the screw-connection is tightened, this region is essentially free of radial force components.

18. The pipe-screw connection as claimed in claim 17, wherein the angle (α) of the abutment surface between the supporting ring and annular pipe bead is about 90°.

19. A pipe screw-connection for connecting a pipeline having a connection end with a deformed annular bead, comprising a connection stub and a screw-connection coupling part, which can be screw-connected to this connection stub in order to retain the pipeline in a sealed manner, the connection stab having an accommodating opening with a radial step surface for axially supporting an end surface of the pipeline and with an inner cone which widens outward away from the step surface, it being possible for the pipeline to be clamped in, by way of the annular bead, with a form fit between the connection stub and a supporting ring which is seated on the pipeline between the annular bead and the screw-connection part, wherein the supporting ring, together with the screw-connection part, forms a conical abutment surface which is at an angle ($\beta$) of approximately 45° relative to the screw-connection longitudinal axis, such that the pipeline is clamped in radially in this region, and wherein the supporting ring, together with the annular bead, forms an abutment surface which is at an angle ($\alpha$) in the range from at least 80° to a maximum of 100° relative to the screw-connection axis, such that, when the screw-connection is tightened, this region is essentially free of radial force components, so that the supporting ring is pressed radially only by means of and in the area of the conical abutment surface with the screw-connection coupling part, which results in the pipeline being clamped radially precisely only in a non-deformed pipe region which is spaced apart from the annular bead, whereby the annular bead of the pipeline has a cone section for inserting into the inner cone of the connection stub, the cone section having a cone angle ($\phi$), corresponding to the inner cone, such that a surface pressure in the inner cone is greater than in the region of the abutment surface between the annular pipe bead and the supporting ring, so that any pipe rotation is avoided during the tightening of the screw-connection coupling part.

* * * * *

UNITED STATES PATENT AND TRADEMARK OFFICE
CERTIFICATE OF CORRECTION

| | | |
|---|---|---|
| PATENT NO. | : 7,000,953 B2 | Page 1 of 1 |
| APPLICATION NO. | : 10/152707 | |
| DATED | : February 21, 2006 | |
| INVENTOR(S) | : Gerd Berghaus | |

It is certified that error appears in the above-identified patent and that said Letters Patent is hereby corrected as shown below:

<u>On the Title Page Item (56),</u>

In column 1, line 4, under "U.S. PATENT DOCUMENTS", delete "2,867,453" and substitute --2,867,463-- in its place.

<u>In the Claims</u>

Column 6, in claim 1, line 11, immediately after "supporting ring" insert --,-- (comma).

Column 7, in claim 2, line 4, after "at least" delete "8°" and substitute --80°-- in its place.

Columns 8-10, in claim 19, line 4, after "screw-connected to" delete "this" and substitute --the-- in its place.

Columns 8-10, in claim 19, line 6, after "connection" delete "stab" and substitute --stub-- in its place.

Columns 8-10, in claim 19, line 11, immediately after "and a supporting ring" insert --,-- (comma).

Columns 8-10, in claim 19, line 27, immediately after "pipe region" insert --,-- (comma).

Signed and Sealed this

Twenty-sixth Day of December, 2006

JON W. DUDAS
*Director of the United States Patent and Trademark Office*